United States Patent
Rho et al.

(10) Patent No.: US 9,001,052 B2
(45) Date of Patent: Apr. 7, 2015

(54) TOUCH SCREEN PANEL AND FABRICATION METHOD THEREOF

(75) Inventors: Soo-Guy Rho, Yongin (KR); Se-Il Cho, Yongin (KR); Jae-Hyun Lee, Yongin (KR); Chung Yi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 807 days.

(21) Appl. No.: 12/898,005

(22) Filed: Oct. 5, 2010

(65) Prior Publication Data

US 2011/0227839 A1 Sep. 22, 2011

(30) Foreign Application Priority Data

Mar. 16, 2010 (KR) .................. 10-2010-0023239

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)

(58) Field of Classification Search
USPC .................. 345/174, 173, 175, 156, 179; 340/12.22; 348/14.02, 552; 725/151
See application file for complete search history.

(56) References Cited

U.S. PATENT DOCUMENTS

| | | | |
|---|---|---|---|
| 5,648,642 A | 7/1997 | Miller et al. | |
| 8,289,296 B2 * | 10/2012 | Jeong et al. | 345/174 |
| 8,368,661 B2 * | 2/2013 | Chang et al. | 345/173 |
| 2008/0264699 A1 | 10/2008 | Chang et al. | |
| 2008/0309635 A1 | 12/2008 | Matsuo | |
| 2010/0156846 A1 * | 6/2010 | Long et al. | 345/174 |
| 2010/0309160 A1 * | 12/2010 | Lin | 345/174 |
| 2011/0090154 A1 * | 4/2011 | Kuo | 345/173 |

FOREIGN PATENT DOCUMENTS

| | | |
|---|---|---|
| CN | 101324827 A | 12/2008 |
| JP | 2006-011522 | 1/2006 |
| JP | 3134925 U | 8/2007 |
| JP | 2008-310550 | 12/2008 |
| JP | 2009-123106 | 6/2009 |
| JP | 2010-044453 | 2/2010 |
| KR | 10-2004-0017139 A | 2/2004 |
| KR | 10-2008-0096352 A | 10/2008 |

(Continued)

OTHER PUBLICATIONS

Japanese Office action dated Mar. 6, 2012, for corresponding Japanese Patent application 2010-153852, (2 pages).

(Continued)

*Primary Examiner* — Dwayne Bost
*Assistant Examiner* — Robert Michaud
(74) *Attorney, Agent, or Firm* — Christie, Parker & Hale, LLP

(57) ABSTRACT

A touch screen panel including: a transparent substrate that incorporate a display region and a non-display region; first sensing patterns that are arranged in a first direction and include first sensing cells and first connection parts; second sensing patterns that are arranged in a second direction and include second sensing cells and second connection parts; an insulating layer that is formed on each of the second connection parts in an island shape; the second sensing cells contact the ends of exposed second connection parts; a plurality of first sensing cells that are arranged on the display region in the first direction intersecting with the second direction; connection parts that connect the adjacent first sensing cells to each other; and metal patterns that are formed in the non-display region and are connected to each of the sensing cells disposed at the ends of the display region.

15 Claims, 5 Drawing Sheets

(56) References Cited

FOREIGN PATENT DOCUMENTS

| KR | 10-2009-0111783 | 10/2009 |
| KR | 10-2010-0010019 | 1/2010 |
| KR | 10-2010-0061993 | 6/2010 |
| KR | 10-2010-0084263 | 7/2010 |
| KR | 10-2011-0022269 | 3/2011 |
| TW | M2344544 U | 11/2008 |

OTHER PUBLICATIONS

KIPO Office action dated May 24, 2011, for Korean priority Patent application 10-2010-0023239, 1 page.

U.S. Appl. No. 12/882,528, filed Sep. 15, 2010, Hee-Chul Jeon, et al., Samsung Mobile Display Co., Ltd.

English translation of Japanese Decision of Grant dated Nov. 13, 2012, for corresponding Japanese Patent application 2010-153852, (2 pages).

English translation of KIPO Decision to Grant dated Oct. 27, 2011, for corresponding Korean Patent application 10-2010-0023241 (2 pages).

SIPO Office action dated Nov. 2, 2014, for corresponding Chinese Patent application 201010560312.X, (8 pages).

* cited by examiner

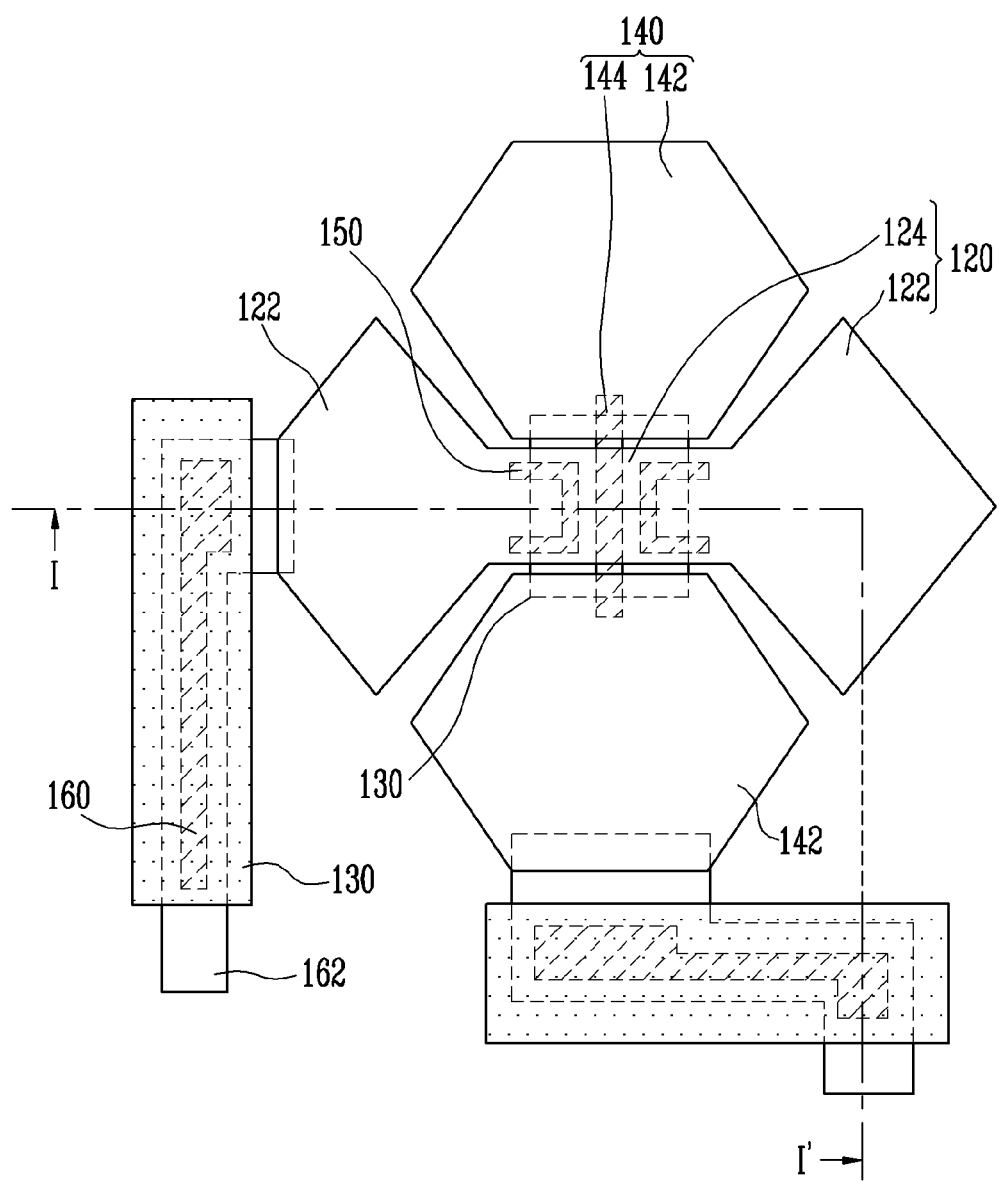

TOUCH SCREEN PANEL AND FABRICATION METHOD THEREOF

CROSS-REFERENCE TO RELATED APPLICATION

This application claims the benefit of Korean Patent Application No. 10-2010-0023239, filed on Mar. 16, 2010 in the Korean Intellectual Property Office, the disclosure of which is incorporated herein by reference.

BACKGROUND

1. Field of the Invention

Aspects of the present invention relate to a touch screen panel and a fabrication method thereof, and more particularly, to a touch screen panel integrally formed on an upper substrate of a flat panel display and a fabrication method thereof.

2. Description of the Related Art

A touch screen panel is an input device that selects contents displayed on a screen such as an image display device, etc. using a person's hand or an object to input commands of a user.

To this end, a touch screen panel is provided on the front face of the image display device and converts positions directly contacting a person's hand or an object into electrical signals. Therefore, the command contents selected at the contact position are received as the input signals. As the touch screen panel can replace a separate input device that is operated by being connected with the image display device such as a keyboard or a mouse, the fields of use for touch screen panels are being expanded gradually.

For implementing the contact for a touch screen panel, a resistive type, a light sensing type, and a capacitive type, etc. have been known.

Among those, when the person's hand or the object contacts the touch screen panel in the capacitive type, the conductive sensing pattern senses the change in capacitance at other adjacent sensing patterns or ground electrodes, etc., thereby converting the contacting position into the electrical signals. In order to clearly determine the contacting position at the contacting surface, the sensing pattern is configured to include first sensing patterns (X patterns) formed to be connected along a first direction and second sensing patterns (Y patterns) formed to be connected along a second direction.

In the related art, the first and second sensing patterns each are disposed on different layers. In other words, as one example, the first sensing patterns are disposed on the lower layer, the second sensing patterns are disposed on the upper layer, and an insulating layer is interposed therebetween.

When each sensing pattern is formed on a different layer, a transparent conductive material (for example, ITO) is used as the sensing patterns have large surface resistance. Accordingly, in order to reduce the surface resistance, a wide connection part connects the sensing patterns disposed on the same layer. However, an overlapping area of each connection part disposed on the upper and lower layers becomes large and the capacity for parasitic capacitance accordingly becomes large, such that the sensitivity sensed by each sensing pattern deteriorates.

In order to overcome these disadvantages, in the related art the first and second sensing patterns can be formed on the same layer and can then be connected by forming separate connection patterns through contact holes formed through the insulating layer on the upper portions of the first or second sensing patterns. In these situations, the connection patterns are made of metal materials having low resistance.

As one example, the connection part of the first sensing patterns is made of the transparent conductive materials like the example disclosed above and the connection part of the second sensing patterns is made of low resistance metal materials and intersects with the connection part of the first sensing patterns.

In other words, the first sensing patterns and the second sensing patterns intersect with each other in the regions where the connection patterns are formed and the widths of the connection patterns are minimized, thereby making it possible to reduce the effect of the parasitic capacitance generated at the intersecting region.

However, even in this case, the connection part connecting the first sensing patterns is still made of the transparent conductive material having a high resistance value and reduces the overlapping area of the intersecting region. Also, since the connection pattern is disposed on the upper portion of the insulating layer, it is vulnerable to static electricity applied or occurring from the outside.

SUMMARY OF THE INVENTION

Aspects of the present invention provide a touch screen panel including first and second sensing cells formed on the same level, first and second connection parts connecting the first and second sensing cells with the second connection part on the same level as the sensing cells, and a small insulating layer surrounding the second connection part.

An embodiment of the present invention provides a touch screen panel including: a transparent substrate that incorporates a display region and a non-display region formed at the outside of the display region; first and second sensing patterns formed in the display region where the first and second sensing patterns include first and second sensing cells, respectively, and first and second connection parts respectively and the first sensing cells and first connection patterns are arranged in a first direction and the second sensing cells and second connection patterns are arranged in a second direction intersecting the first direction; an insulating layer is formed on each of the second connection parts in an island shape to expose ends of the second connection parts; first connection parts that connect the adjacent first sensing cells to each other and are formed on the insulating layer in an island shape; and metal patterns that are formed in the non-display region and are connected to each of the first sensing cells and the second sensing cells disposed at the ends of the display region The upper portion of each metal pattern is further provided with a conductive protective layer made of a transparent conductive material, the touch screen panel further includes an insulating layer formed on each conductive protective layer in an island shape to expose the ends of the conductive protective layer, and each exposed conductive protective layer contacts a first sensing cell or a second sensing cell disposed at the end of the display region.

In addition, the touch screen panel further includes a pair of auxiliary patterns that are disposed underneath the lower portion of the insulating layer and formed to be spaced by a predetermined interval from both sides of the second connection part, each end of the pair of auxiliary patterns is exposed to the outside of the insulating layer in the island shape, and each end of the exposed auxiliary pattern contacts a first sensing cell.

Further, the second connection parts and the metal patterns are formed on the same level and are made of metal having a lower resistance value than that of the material forming the sensing cells and the first and second sensing cells are made of the transparent conductive material.

Another embodiment of the present invention provides a fabrication method for a touch screen panel including: forming a plurality of first and second sensing patterns that include first and second sensing cells, respectively, and first and second connection patterns, respectively; forming of the second connection parts to be arranged in a second direction on transparent substrates that incorporates a display region and a non-display region formed at the outside of the display region; forming an insulating layer on each of the second connection parts in an island shape to expose ends of the connection parts; forming the second sensing cells to contact the ends of the exposed second connection patterns to be electrically connected to each other and to be arranged in the second direction; and forming a plurality of first sensing cells that are arranged on the display region in a first direction intersecting with the second direction and first connection parts that connect the adjacent first sensing cells to each other and are formed on the insulating layer in the island shape.

In addition, the fabrication method for the touch screen panel includes forming metal patterns that are disposed in the non-display region and electrically connect the first sensing cell and the second sensing cell disposed at the end of the display region, respectively, and the connection patterns and the metal patterns are formed on the same level in the same process and are made of metal having a lower resistance value than that of the material forming the sensing cells.

Further, the fabrication method for the touch screen panel includes forming a conductive protective layer made of the transparent conductive materials and disposed on the upper portions of each of the metal patterns and forming an insulating layer in an island shape on each of the conductive protective layers to expose the end of the conductive protective layer.

Further, the fabrication method for the touch screen panel includes forming a pair of auxiliary patterns that are positioned underneath the lower portion of the insulating layer and spaced by a predetermined interval from both sides of the connection pattern and each end of the pair of auxiliary patterns is exposed to the outside of the insulating layer in the island shape and each end of the exposed auxiliary patterns contacts a first sensing cell.

According to the exemplary embodiments of the present invention, each of the connection patterns connecting the adjacent first or second sensing cells to each other is made of the same low resistance metal material as the metal pattern formed at the outside of the touch screen panel to reduce or eliminate the vulnerability to static electricity of the connection pattern, thereby making it possible to overcome any electrostatic discharge (ESD) problem.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1A is a plan view showing an arrangement of sensing patterns formed on a touch screen panel according to an exemplary embodiment of the present invention;

DETAILED DESCRIPTION OF THE EMBODIMENTS

Figure 1B:
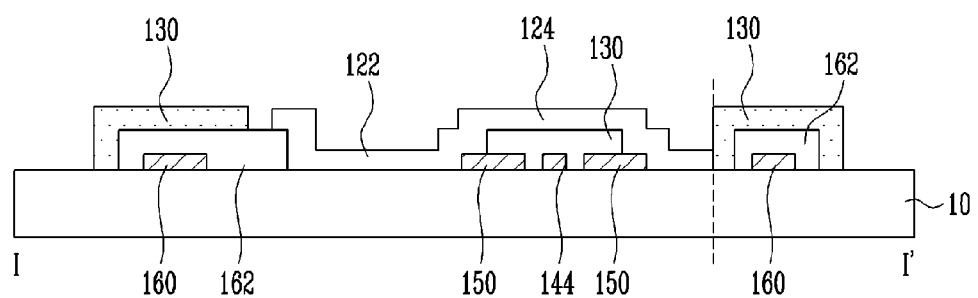
FIG. 1B is a cross-sectional view of a specific portion (I-I') of FIG. 1A.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on," "disposed on" or "formed on" another element, it can be directly on the another element or be indirectly on the other element with one or more intervening elements interposed therebetween. Also, when an element is referred to as being "connected to" another element, it can be directly connected to the other element or be indirectly connected to the other element with one or more intervening elements interposed therebetween. Furthermore, the structures on the same level can be formed into sub-levels.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1A is a plan view showing an arrangement of sensing patterns formed on a touch screen panel according to an exemplary embodiment of the present invention and FIG. 1B is a cross-sectional view of a specific portion (I-I') of FIG. 1A. FIGS. 1A and 1B describe 2×2 sensing patterns disposed at one end of a display region among a plurality of first and second sensing patterns that are arranged on the display region.

Referring to FIGS. 1A and 1B, the sensing patterns according to this embodiment include first and second sensing patterns 120 and 140 that are formed in the display region of a transparent substrate 10 partitioned into a display region and a non-display region formed at the outside of the display region, are alternately disposed to each other and are formed to be connected to each other in one column unit whose X coordinates are the same and one row unit whose Y coordinates are the same. In other words, the first sensing patterns 120 are configured to include first sensing cells 122 arranged in one column whose Y coordinates are the same and a first connection part 124 that connects the adjacent first sensing cells 122 and the second sensing patterns 140 are configured to include second sensing cells 142 arranged in one row whose X coordinates are the same and a second connection part 144 that connects the adjacent second sensing cells 142.

In this embodiment, the first sensing cells 122 and the second sensing cells 142 are formed on the same layer and the first and second sensing cells 122 and 142 should be made of a transparent material to implement the operation of the touch screen panel. Therefore, it is preferable that the first and second sensing cells 122 and 142 are made of a transparent conductive material, for example, indium tin oxide (hereinafter, ITO).

Further, in order for the first sensing cells 122 and the second sensing cells 142 to serve as the sensing electrodes, the sensing cells 122 arranged in the first direction and the sensing cells 142 arranged in the second direction should be electrically connected to each other. Therefore, the first sensing cells 122 are electrically connected to each other by the first connection part 124 and the second sensing cells 142 are electrically connected to each other by the second connection part 144.

In this embodiment, the first connection part 124 is integrally formed with the first sensing cells 122 and the adjacent first sensing cells 122 are connected through the first connection part 124. In other words, the first connection part 124 is made of the same transparent conductive material as the first sensing cell 122.

On the other hand, the second connection part 144 is made of other materials that electrically connect the adjacent second sensing cells 142. Therefore, since the first sensing cells 122, the first connection part 124, and the second sensing cells 142 are formed on the same level, the second connection part 144 intersecting with the second connection part 124 may not be formed on the same sub-level as the first and second sensing cells 122 and 142 in order to avoid short circuits therebetween. Therefore, in this embodiment, the second connection part 144 is formed separate from the first and second sensing cells 122 and 142.

In this embodiment of the present invention, the second connection part 144 is made of low resistance metal. In addition, where the second connection part 144 is formed adjacent to the non-display region at an end of the display region in which the first and second sensing cells 122 and 142 are formed it is made of the same material as a metal pattern 160 supplying the signals sensed by the sensing cells to a driving circuit (not shown).

In other words, the region in which the plurality of sensing patterns 120 and 140 are formed is a display region that displays images and detects touched positions and the region in which the metal patterns 160 are electrically connected to the sensing patterns 120 and 140 is a non-display region that is provided at the outside of the display region. In this case, since the second connection parts 144 are formed on the same level as the metal pattern 160 through the same process, an additional mask process for forming the second connection parts 144 is not required, thereby making it possible to reduce the number of processes and time. In this configuration, the second connection part 144 connecting the second sensing cells 142 to each other is made of the low resistance metal, not the transparent conductive materials, such that charge flow can be evened out at the second connection part 144 of the second sensing cell 142, thereby improving the sensing sensitivity of the sensing cells.

In addition, the metal pattern 160 is electrically connected to the first and/or the second sensing 122 and/or 142 cell disposed at the end of the display region, which serves to supply the signals sensed by the sensing cells 122 and 142 to the driving circuit (not shown). However, in this embodiment, the upper portion of the metal pattern 160 is further provided with a conductive protective layer 162 made of a conductive material, which can prevent the corrosion of the metal pattern 160 occurring during the process.

In addition, the region between where the second connection part 144 and the first connection part 124 are connected to overlap with each other is formed with an insulating layer 130 in an island shape to prevent a short circuit between the second connection part 144 and the first connection part 124. Further, another insulating layer 130 in the island shape is formed on the conductive protective layer 162. The insulating layer 130 is an inorganic insulating layer of a transparent material, preferably, silicon dioxide ($SiO_2$) or silicon nitride ($Si_3N_4$). As a result, the second connection part 144 made of a low resistance metal is disposed underneath the insulating layer 130 to reduce or eliminate the vulnerability to static electricity, thereby making it possible to overcome any electrostatic discharge (ESD) problem.

As shown, the insulating layer 130 in the island shape does not cover the entire second connection part 144 but is formed in a region other than a portion contacting both ends of the second connection part 144, that is, the second sensing cell 142. As a result, the second connection part 144 and the second sensing cells 142 are electrically connected to each other without needing to include a separate contact hole.

In addition, the insulating layer 130 formed on the conductive protective layer 162 is also formed to expose a portion contacting the first sensing cell 122 or the second sensing cell 142. However, when the insulating layer 130 is formed in the island shape, the first connection part 124 formed above the insulating layer 130 is connected to the first sensing cell 122 at the end of the insulating layer 130 formed with a step.

In other words, the portion where the width of the first sensing cell 122 is narrow intersects with a portion where the step of the insulating layer 130 is formed. Resistance is locally increased at the border region, such that the first connection part 124 connecting the first sensing cells 122 may be easily damaged by static electricity. This may cause a driving defect of the touch screen panel while causing heat damage due to the concentration of joule heating at the border region when the static electricity is introduced.

In this embodiment of the present invention, an auxiliary pattern 150 is further formed underneath the insulating layer 130 corresponding to the region. In other words, a pair of auxiliary patterns 150 spaced by a predetermined interval from the second connection part 144 is further formed at both ends of the second connection part 144 and is electrically connected to the adjacent first sensing cells 122, respectively. The auxiliary pattern 150 is made of the same low resistance metal as the second connection part 144.

As shown, the insulating layer 130 in the island shape does not cover the entire connection patterns 150 but is formed in a region other than a portion contacting both ends of the auxiliary pattern 150, that is, the first sensing cell 122. As a result, the pair of auxiliary patterns 150 and the adjacent first sensing cells 122 is electrically connected to each other without needing to include a separate contact hole.

The sudden resistance increase at the portion where the first connection part 124 is formed can be prevented by the auxiliary patterns 150 as well as the line resistance in a line unit where the first sensing cells 122 are connected can be reduced. As a result, the driving defect of the touch screen panel due to static electricity can be prevented and the driving characteristics of the touch screen panel can be improved.

In the exemplary embodiment, the second connection part 144 may be formed in a rectangular bar shape as shown and the auxiliary patterns 150 may be formed in letter '⊏' shapes, but this is shown as an example only, and therefore, the shapes are not necessarily limited thereto.

As described, FIGS. 1A and 1B describe, by way of example, 2×2 sensing patterns disposed at one end of a display region among a plurality of first and second sensing patterns that are arranged on the display region. FIGS. 2A, 2C, 2E and 2G are plan views showing a fabrication process for a touch screen panel according to the exemplary embodiment of the present invention shown in FIG. 1. FIGS. 2B, 2D, 2F and 2H are cross-sectional views showing the fabrication process for a touch screen panel according to the exemplary embodiment of the present invention shown in FIG. 1.

Figure 2A:
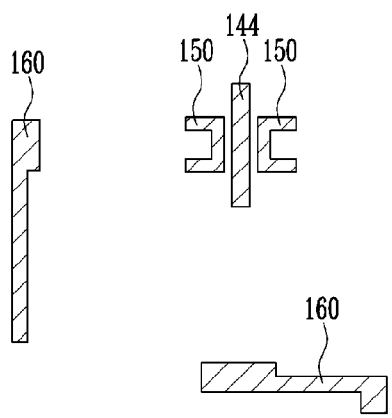
FIGS. 2A, 2C, 2E and 2G are plan views showing steps in a fabrication process of a touch screen panel according to the exemplary embodiment of the present invention shown in FIG. 1.
Figure 2B:
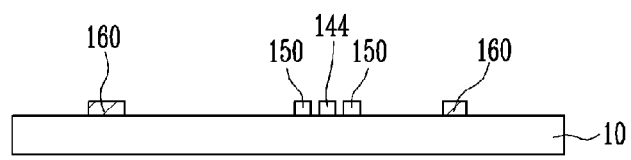
FIGS. 2B, 2D, 2F and 2H are cross-sectional views showing steps in a fabrication process of a touch screen panel according to the exemplary embodiment of the present invention shown in FIG. 1.

Referring first to FIGS. 2A and 2B, the metal pattern 160, the second connection part 144, and the auxiliary pattern 150 are formed on the transparent substrate 10. The transparent substrate 10 is partitioned into the display region and the non-display region formed on the outside of the display region.

The metal pattern 160, the second connection part 144, and the auxiliary pattern 150 are made of a low resistance metal. Examples of the low resistance metal may include molybdenum (Mo), silver (Ag), titanium (Ti), copper (Cu), aluminum (Ti), molybdenum/aluminum/molybdenum (Mo/Al/Mo), etc.

The metal pattern 160 is formed in the non-display region adjacent to both ends of the display region in which the first and second sensing cells 122 and 142 (not shown) will be formed later and supplies the signals sensed by the sensing cells 122 and 142 to the driving circuit (not shown). The metal pattern 160 formed at the left among the metal patterns shown in FIG. 2A is electrically connected to the first sensing cell 122 formed later and the metal pattern 160 formed at the lower side is electrically connected to the second sensing cell 142 formed later.

In addition, the second connection part 144 electrically connects the second sensing cells 142 to each other and is arranged to be spaced by a predetermined interval in a direction (for example, Y direction) where the second sensing cells 142 are arranged in the display region. Further, the pair of auxiliary patterns 150 is implemented to be spaced by a predetermined interval from the second connection part 144, which is also electrically connected the first sensing cells 122, respectively.

Figure 2C:
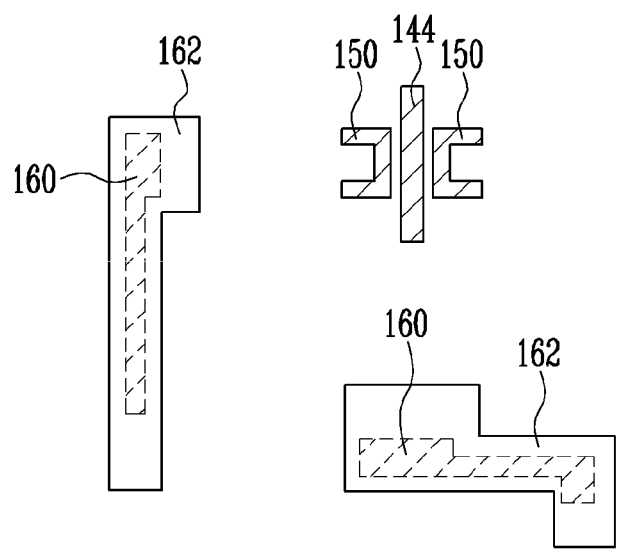
Figure 2D:
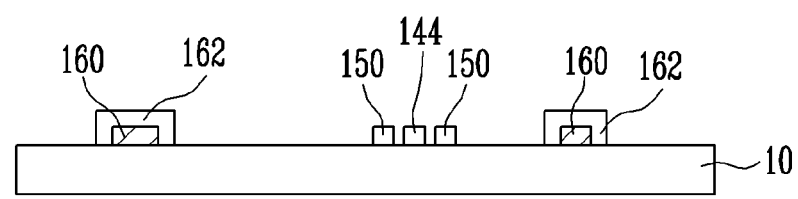

Next, referring to FIGS. 2C and 2D, the conductive protective layers 162 made of the transparent conductive material are formed on the metal patterns 160. Here the conductive protective layers 162 are made of the transparent conductive material, for example, ITO, which serves to prevent the corrosion of the metal patterns 160 that can occur during the process. Further, the left conductive protective layer 162 formed on the left metal pattern 160 contacts the first sensing cell 122 formed later and the lower conductive protective layer 162 formed on the lower metal pattern 160 contacts the second sensing cell 142 formed later.

Figure 2E:
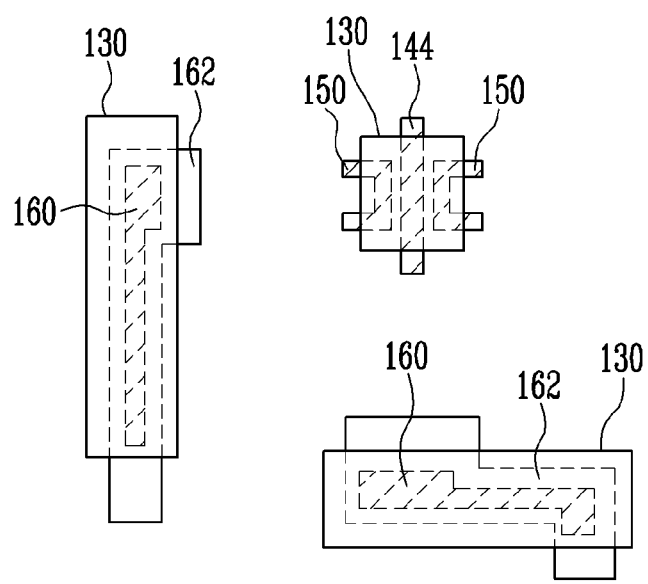
Figure 2F:
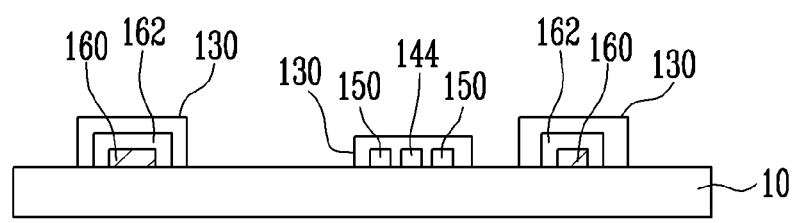

Next, referring to FIGS. 2E and 2F, the insulating layers 130 in the island shape are formed to overlap the conductive protective layers 162, the second connection pattern 144, and the auxiliary pattern 150. The insulating layers 130 are inorganic insulating layers of a transparent material and, preferably, made of silicon dioxide ($SiO_2$) or silicon nitride ($Si_3N_4$).

As shown, the insulating layers 130 in the island shape do not cover the entire second connection pattern 144 and auxiliary patterns 150 but are formed in regions other than portions contacting both ends of the second connection part 144 and the auxiliary patterns 150, that are portions contacting the first and second sensing cell 122 and 142. As a result, the second connection part 144 and the second sensing cells 142 are electrically connected to each other and the auxiliary patterns 150 and the first sensing cells 122 are electrically connected to each other, without needing to include separate contact holes. In addition, the insulating layers 130 formed on the conductive protective layers 162 are also formed to expose portions contacting the first sensing cell 122 and the second sensing cell 124.

Figure 2G:
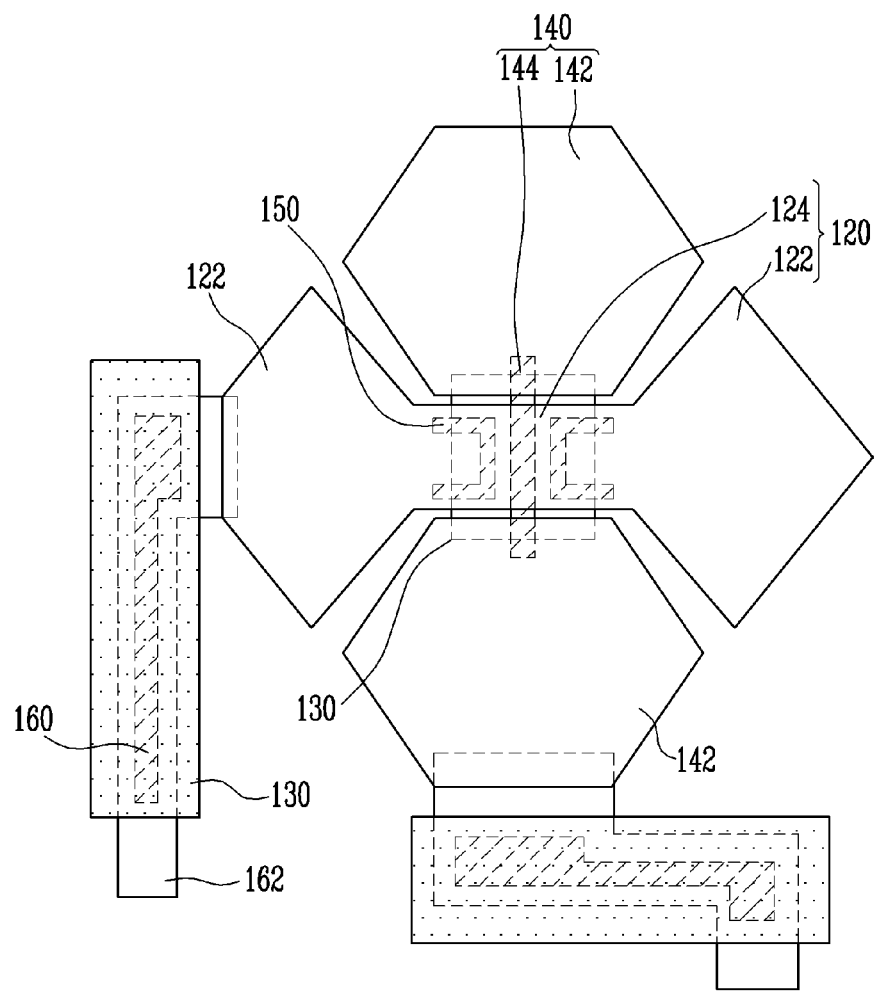
Figure 2H:
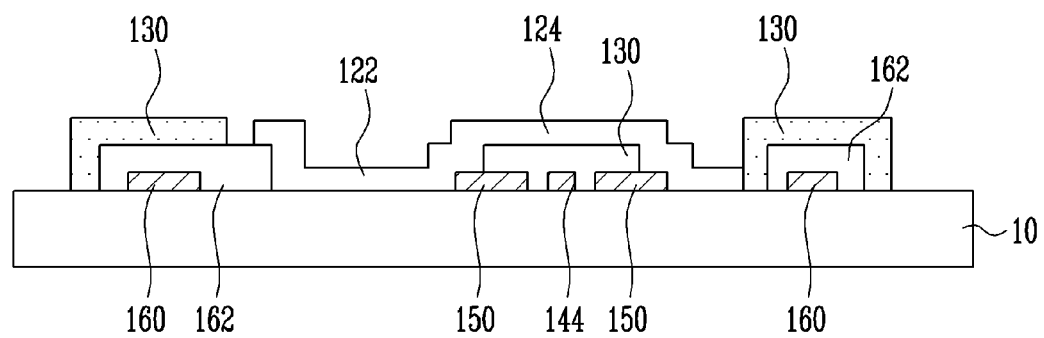

Finally, as shown in FIGS. 2G and 2H, the first sensing cells 122 and the first connection part 124 connecting the first sensing cells 122 and the second sensing cells 142 are formed.

The first sensing cells 122 and the second sensing cells 142 are disposed on the same level through the same process and the first and second sensing cells 122 and 142 are made of the transparent material to implement the operation of the touch screen panel. In other words, the first and second sensing cells 122 and 142 are made of the transparent conductive material, that is, ITO as one example.

Further, in order for the first sensing cells 122 and the second sensing cells 142 to serve as the sensing electrodes, each of the first sensing cells 122 arranged in the X direction and the second sensing cells 142 arranged in the Y direction should be electrically connected to each other. Therefore, the first sensing cells 122 are electrically connected to each other by the first connection part 124 and the second sensing cells 142 are electrically connected to each other by the second connection part 144 that is previously formed.

In this embodiment, the first connection part 124 is integrally formed with the first sensing cells 122 and all the adjacent first sensing cells 122 are connected through first connection parts 124. In other words, the first connection parts 124 are made of the same transparent conductive material as the first sensing cells 122 through the same process.

The insulating layer 130 is formed underneath the first connection part 124 and the pair of auxiliary patterns 150 exposed to the left and right of the lower insulating layer 130 contacts the first sensing cell 122. Further, the second sensing cells 142 contact the second connection pattern 144 exposed under the lower insulating layer 130, such that the adjacent second sensing cells 142 are electrically connected to each other.

In addition, as shown, the first sensing cell 122 disposed on the left end among the display regions contacts the end of the conductive protective layer 162 disposed at the left outer portion such that it is electrically connected to the metal pattern 160 formed under the conductive protective layer 162. Similarly, the second sensing cell 142 disposed on the lower end among the display regions contacts the end of the conductive protective layer 162 disposed at the lower outer portion such that it is electrically connected to the metal pattern 160 formed under the conductive protective layer 162.

As a result, the first sensing patterns 120 are configured to include the first sensing cells 122 arranged in one row whose Y coordinates are the same and the first connection part 124 that connects the adjacent first sensing cells 122 and the second sensing patterns 140 is configured to include the second sensing cells 142 arranged in one column whose Y coordinates are the same and the second connection part 144 that connects the adjacent second sensing cells 142.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
   a transparent substrate that incorporates a display region and a non-display region formed at the outside of the display region;
   first sensing patterns that are arranged in a first direction and include first sensing cells and first connection parts;
   second sensing patterns that are arranged in a second direction and include second sensing cells and second connection parts;
   an insulating layer comprising spatially separated first insulating portions, each first insulating portion having an island shape, and formed on the second connection parts to expose ends of the second connection parts;

metal patterns that are formed in the non-display region and are connected to each of the first sensing cells and the second sensing cells disposed at ends of the display region; and a pair of auxiliary patterns that are disposed underneath the insulating layer and are spaced by an interval from both sides of the second connection parts, wherein:
the second connection parts are arranged on the display region in the second direction,
the second sensing cells contact the exposed ends of the second connection parts to be electrically connected to each other,
the first sensing cells are arranged on the display region in the first direction to intersect with the second direction,
the first connection parts connect adjacent first sensing cells to each other and are formed on the insulating layer,
the auxiliary patterns are electrically connected to corresponding ones of the first sensing cells, and
at least a portion of the insulating layer is interposed between the pair of auxiliary patterns.

2. The touch screen panel as claimed in claim 1, wherein an upper portion of each metal pattern is further provided with a conductive protective layer made of a transparent conductive material.

3. The touch screen panel as claimed in claim 2, wherein the insulating layer further comprises second insulating portions, each second insulating portion formed on a corresponding conductive protective layer to expose ends of the conductive protective layer.

4. The touch screen panel as claimed in claim 3, wherein, for each conductive protective layer, an exposed end of the conductive protective layer contacts a corresponding one of the first sensing cells or the second sensing cells disposed at an end of the display region.

5. The touch screen panel as claimed in claim 1, wherein each end of the pair of auxiliary patterns is exposed to the outside of a corresponding one of the first insulating portions.

6. The touch screen panel as claimed in claim 5, wherein each end of the auxiliary pattern contacts a corresponding one of the first sensing cells.

7. The touch screen panel as claimed in claim 1, wherein the second connection parts and the metal patterns are formed on a same level and are made of metal having a lower resistance value than that of a material forming the sensing cells.

8. The touch screen panel as claimed in claim 1, wherein the first sensing cells and second sensing cells are made of a transparent conductive material.

9. A fabrication method for a touch screen panel comprising first sensing patterns that are arranged in a first direction and include first sensing cells and first connection parts and second sensing patterns that are arranged in a second direction and include second sensing cells and second connection parts, a transparent substrate that incorporates a display region and a non-display region formed at the outside of the display region and an insulation layer, the method comprising:

forming the second connection parts arranged in the second direction on the display region of the transparent substrate;

forming an insulating layer comprising spatially separated first insulating portions on the second connection parts, each first insulating portion having an island shape to expose ends of the second connection parts;

forming the second sensing cells that are arranged in the second direction and contact the exposed ends of the second connection parts to be electrically connected to each other;

arranging the first sensing cells on the display region in the first direction to intersect with the second direction; and further comprising forming a pair of auxiliary patterns that are positioned under the insulating layer and are spaced by an interval from a corresponding side of the second connection parts, wherein the first connection parts that connect adjacent first sensing cells to each other are formed on the insulating layer, the auxiliary patterns are electrically connected to corresponding ones of the first sensing cells, and at least a portion of the insulating layer is interposed between the pair of auxiliary patterns.

10. The fabrication method of the touch screen panel as claimed in claim 9, further comprising forming metal patterns in the non-display region and electrically connecting each of the metal patterns to a corresponding one of the first sensing cells or the second sensing cells disposed at an end of the display region.

11. The fabrication method of the touch screen panel as claimed in claim 10, wherein the second connection parts and the metal patterns are formed on a same level in a same process and are made of metal having a lower resistance value than that of a material forming the sensing cells.

12. The fabrication method of the touch screen panel as claimed in claim 10, further comprising forming conductive protective layers that are made of transparent conductive materials on upper portions of each of the metal patterns.

13. The fabrication method of the touch screen panel as claimed in claim 12, wherein the forming the insulating layer further comprises forming second insulation portions on each of the conductive protective layers and exposing the ends of the conductive protective layers.

14. The fabrication method of the touch screen panel as claimed in claim 9, wherein each end of the pair of auxiliary patterns is exposed to the outside of a corresponding one of insulating portions and each end of the exposed auxiliary patterns contacts a corresponding one of the first sensing cells.

15. The touch screen panel as claimed in claim 1, wherein the auxiliary patterns comprise a first portion extending in a direction parallel to the second connection parts and a second portion extending in a direction perpendicular to the second connection parts.

* * * * *